(12) United States Patent
Sacripante et al.

(10) Patent No.: US 8,916,322 B2
(45) Date of Patent: Dec. 23, 2014

(54) SUSTAINABLE TONER

(71) Applicant: Xerox Corporation, Norwalk, CT (US)

(72) Inventors: Guerino G. Sacripante, Oakville (CA); Shigang Qiu, Toronto (CA); Santiago Faucher, Oakville (CA); Ke Zhou, Oakville (CA); John Abate, Mississauga (CA); John Kallo, Toronto (CA)

(73) Assignee: Xerox Corporation, Norwalk, CT (US)

( * ) Notice: Subject to any disclaimer, the term of this patent is extended or adjusted under 35 U.S.C. 154(b) by 40 days.

(21) Appl. No.: 13/678,341

(22) Filed: Nov. 15, 2012

(65) Prior Publication Data

US 2014/0134534 A1    May 15, 2014

(51) Int. Cl.
*G03G 9/087*    (2006.01)

(52) U.S. Cl.
USPC .................................. 430/109.2; 430/110.4

(58) Field of Classification Search
USPC ............................................ 430/109.4, 110.2
See application file for complete search history.

(56) References Cited

U.S. PATENT DOCUMENTS

| | | | |
|---|---|---|---|
| 2006/0128906 A1* | 6/2006 | Winters et al. | 525/437 |
| 2009/0156784 A1* | 6/2009 | Kubo et al. | 530/211 |
| 2009/0286176 A1* | 11/2009 | Ohmura et al. | 430/107.1 |
| 2012/0149791 A1* | 6/2012 | Felice et al. | 521/48.5 |
| 2012/0183896 A1 | 7/2012 | Sacripante et al. | |
| 2012/0183897 A1 | 7/2012 | Farrugia et al. | |

* cited by examiner

*Primary Examiner* — Peter Vajda
(74) *Attorney, Agent, or Firm* — MDIP LLC

(57) ABSTRACT

The present disclosure describes toner that is composed substantially of biodegradable and recycled materials.

20 Claims, No Drawings

SUSTAINABLE TONER

FIELD

Toner comprising sustainable material or reagents, such as, depolymerized recycled plastic and bio-based materials; developers comprising said toner; devices comprising the toner and developers; imaging device components comprising the toner and developers; imaging devices comprising the developers; and so on, are described.

BACKGROUND

Current toner generally comprises petroleum-based reagents.

Renewable or biodegradable reagents and materials, such as those which are plant-based/animal-based or which are readily biodegradable are being investigated as replacements for current toner reagents.

Another approach is to determine whether recycled materials can be used in toner.

SUMMARY

The present disclosure describes a sustainable toner resin comprising a polyester comprising bio-based polyacid or polyester reagents and a polyol comprising a depolymerized recycled plastic comprising oligomeric polyethylene terephthalate (PET), an optional wax and an optional colorant. Oligomeric PET can be obtained by glycolysis of polyethylene terephthalate plastics, such as, plastic bottles, which are pelleted and depolymerized, that is, digested, with a glycol to form ethylene terephthalate (ET) and low molecular PET oligomers, which are polyol compounds.

In embodiments, a toner is disclosed comprising a first sustainable amorphous polyester resin emulsion, an optional second amorphous resin emulsion, an optional crystalline resin emulsion, an optional wax, optionally a shell and an optional colorant. The second amorphous resin and/or the crystalline resin can comprise a sustainable polymer. The toner may have a sustainability content of at about 70%.

DETAILED DESCRIPTION

I. Definitions

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein are the terms, "equivalent," "similar," "essentially," "substantially," "approximating" and "matching," or grammatic variations thereof, which have generally acceptable definitions or at the least, are understood to have the same meaning as, "about."

In the application, use of the singular includes the plural unless specifically stated otherwise. In the application, use of, "or," means, "and/or," unless stated otherwise. Furthermore, use of the term, "including," as well as other forms, such as, "includes," and, "included," is not limiting.

For the purposes of the instant disclosure, "toner," "developer," "toner composition," and "toner particles," can be used interchangeably, and any particular or specific use and meaning will be evident from the context of the sentence, paragraph and the like in which the word or phrase appears.

As used herein, "bio-based" means a commercial or industrial product (other than food or feed) that is composed, in whole or in substantial part (e.g., at least about 50%, at least about 60%, at least about 70%, at least about 80%, at least 90% by weight), of biological products or renewable agricultural materials (including plant, animal, and marine materials), forestry materials or other naturally occurring source. A biodegradable reagent is 100% bio-based. The reagent or product is one which is biodegradable, that is, the product can be degraded by natural processes, such as, by a microorganism, over a period of time comprising days, months or possibly a year or two, but not an excessive number of years, such as, not more than about 5 years. Bio-based resins which may be usable in toner are available commercially, for example, Entropy Resins, Gardena, C A and Chimar Hellas, S. A., Thessaloniki, G R; and bio-based reagents which might be usable in a toner resin are available, for example, from Sigma-Aldrich, St. Louis, Miss. For example, rosin acids may be used, such as, disproportionate rosin acid available from Arakawa Chemical, Osaka, J P or rosin-fumarate adduct available from Harima Chemicals, Duluth, Ga. Toner comprised in part of bio-based materials is available from, for example, Ink4Less, Tigard, Oreg. and PrintService GmbH, Eschweiber, Del.

"PET oligomers," (or grammatic forms thereof) as used herein comprise an oligomer of ethylene terephthalate which can have a molecular weight of from about 400 (the approximate weight of an ET dimer) to about 5,000 g/mole. Oligomeric PET can be derived by glycolysis of existing PET (poly(ethylene terephthalate)) materials, such as, bottles, such as, those holding carbonated beverages, juices and waters, and so on. The consumer PET materials prior to depolymerization generally have a number average molecular weight of from about 5,000 to about 500,000 g/mole. The PET oligomers, which comprise two or more ET residues, and monomers are polyols that can be used to make polyester resins for use in toner. PET oligomer also includes the ET monomer obtained in the depolymerization reaction.

As used herein, "sustainability," or grammatic forms thereof, refers to the amount, percentage, content or other measure of components in a toner that is bio-based and is reused from a prior and other purpose product and recycled for use in toner. Hence, the current disclosure in part relates to the reuse of spent recycled poly(ethylene-terephthalate) (PET) which is found commonly in liquid containers. For example, a sustainable toner of interest may be comprised of at least about 25% recycled material as taught herein. Hence, on a weight or molar basis, that toner particle contains about 25% recycled material and has a sustainability content of 25%. If that toner also comprised a resin that comprises 50% of a bio-based reagent, such as, a polyol or a polyacid/polyester used to make the resin is obtained from a plant source, that toner will have a sustainability content of 75%. Toners of interest comprise at least about 70% sustainable content, at least about 80% sustainable content, at least about 90% sustainable content, at least about 95% or more. Generally, the calculation of the level of sustainability of a toner is made relative to the toner particle per se, without surface additives and without carrier. Hence, in the context of an emulsion/aggregation toner, the calculation would be based on the toner particle following any aggregation and coalescence. A sustainable resin or polymer comprises at least about 50% sustainable content, at least about 60%, at least about 70%, at least about 80%, at least about 90% or more sustainable content.

II. Toner Particles

Toner particles of interest can comprise a polyester resin. A composition can comprise more than one form or sort of polymer, such as, two or more different polymers, such as, two or more different polyester polymers composed of different monomers. The polymer can be an alternating copolymer, a block copolymer, a graft copolymer, a branched copolymer, a crosslinked copolymer and so on.

The toner particle can include other optional reagents, such as, a surfactant, a wax, a shell and so on. The toner composition optionally can comprise inert particles, which can serve as toner particle carriers, which can comprise a resin taught herein. The inert particles can be modified, for example, to serve a particular function. Hence, the surface thereof can be derivatized or the particles can be manufactured for a desired purpose, for example, to carry a charge or to possess a magnetic field.

A. Components

1. Resin

Toner particles of the instant disclosure include a resin-forming monomer suitable for use in forming a particulate, optionally containing or carrying a colorant, of a toner for use in certain imaging devices. Any polyfunctional monomer may be used depending on the particular polymer desired in a toner particle. Hence, bifunctional reagents, trifunctional reagents and so on can be used. One or more reagents that comprise at least three functional groups can be incorporated into a polymer or into a branch to enable branching, further branching and/or crosslinking. Certain resins, for example, can be used for applications requiring low melting temperature. Formed particles can be mixed with other reagents, such as, a colorant, to form a developer.

One, two or more polymers may be used in forming a toner or toner particle. In embodiments, where two or more polymers are used, the polymers may be in any suitable ratio (e.g., weight ratio) such as, for instance, with two different polymers, from about 1% (first polymer)/99% (second polymer) to about 99% (first polymer)/1% (second polymer), in embodiments, from about 10% (first polymer)/90% (second polymer) to about 90% (first polymer)/10% (second polymer) and so on, as a design choice.

The polymer may be present in an amount of from about 65 to about 95% by weight, from about 75 to about 85% by weight of toner particles on a solids basis. A polymer may comprise from about 5 to about 70%, from about 7 to about 60%, from about 10 to about 50% by weight PET oligomer. A toner may comprise from about 25% to about 90%, from about 35% to about 88%, from about 45% to about 85% bio-based material. Amounts outside of those ranges can be used as a design choice to achieve the desired sustainability content.

a. Toner Resins Comprising PET Oligomers

PET sources include, for example, films, such as, materials, cloths and so on, with a more commonly available source being spent liquid containers. For example, empty bottles, such as, clear or colorless bottles that do not carry bottle colorants, can be washed, dried and shredded into a granular or pellet form, for example, pellets of a size of about 3 mm by about 3 mm by about 1 mm. The pellets can be treated in a depolymerization reaction, such as, partial glycolysis by heating under nitrogen with a catalyst in an organic diol, such as, an alkylene glycol, such as, ethylene glycol, propylene glycol, butylenes glycol, pentylene glycol and so on. Suitable catalysts are known, such as, titanium phosphate, metal acetate, such as, zinc acetate, solid super acids, ionic liquids and so on. Following reaction, the products obtained are ET, PET oligomers and alkylene glycol monomer, where the number average molecular weight of the oligomeric PET can be from about 200 (the approximate weight of ET) to about 5000 grams per mole, from about 400 (the approximate weight of an ET dimer) to about 3500 g/m, from about 600 (the approximate weight of an ET timer) to about 2000 g/mole.

The PET oligomers can be reacted with diacid or diester monomers, such as, anhydride forms thereof, as known in the art and as taught herein, with an optional catalyst, to produce polyester polymers which can be used to substitute for a portion of the resins commonly found in toner. In embodiments, the diacid or diester is bio-based. The remainder of the resins comprises those known in the art and which are taught herein.

b. Polyester Resins

Suitable polyester resins include, for example, those which are sulfonated, non-sulfonated, crystalline, amorphous, combinations thereof and the like. The polyester resins may be linear, branched, crosslinked, combinations thereof and the like. Polyester resins may include those described, for example, in U.S. Pat. Nos. 6,593,049; 6,830,860; 7,754,406; 7,781,138; 7,749,672; and 6,756,176, the disclosure of each of which hereby is incorporated by reference in entirety.

Examples of a bio-based resin are provided in US Pub. No. 20120156607, 20110217648, 20110212396, 20110207046, 20110003243, 20100203439 and 20100099037, each of which herein is incorporated by reference in entirety. Bio-based reagents can include reagents derived from vegetable oils, polysaccharides, sugar acids, fatty acids, fatty alcohols and the like, which are available commercially or can be obtained from plant, animal or microbe sources practicing methods known in the art.

Examples of bio-based polymeric resins which may be utilized include polyesters derived from monomers including a fatty dimer acid or diol of soya oil, D-isosorbide, and/or amino acids such as L-tyrosine and glutamic acid, as described in U.S. Pat. No. 8,221,948, incorporated herein by reference in entirety, 1,4:3,6-dianhydro-D-sorbitol (isosorbide), nonanedioic acid (azelaic acid) and butanedioic acid (succinic acid) as disclosed in U.S. Pat. No. 8,163,459, herein incorporated by reference in entirety, a polyhydroxyalkanoate, such as, polyhydroxybutyrate and polyhydroxyvalerate, copolyesters containing randomly arranged units of 3-hydroxybutyrate and 3-hydroxyvalerate, and combinations thereof, as disclosed in U.S. Pat. No. 8,187,780, citric acid, citric acid anhydride, as disclosed in US Publ. No. 20120156607, herein incorporated by reference in entirety, a resin acid, such as, abietic acid, neoabietic acid, palustric acid, pimaric acid, levopimaric acid, isopimaric acid, dehydroabietic acid or a mixture thereof, maleic acid, fumaric acid, itaconic acid or a mixture thereof, as disclosed in US Publ. No. 20120183896, a rosin diol generated from a rosin acid and a glycerine carbonate and so on.

When a mixture is used, such as, amorphous and crystalline polyester resins, the ratio of crystalline polyester resin to amorphous polyester resin may be in the range from about 1:99 to about 30:70; from about 5:95 to about 25:75; in embodiments, from about 5:95 to about 15:95.

A polyester resin may be obtained synthetically, for example, in an esterification reaction involving a polyfunctional reagent comprising carboxylic acid groups and another polyfunctional reagent comprising alcohol groups, such as PET oligomers. In embodiments, the alcohol reagent (a polyol) comprises two or more hydroxyl groups, in embodiments, three or more hydroxyl groups. In embodiments, the acid (a polyacid or polyester) comprises two or more carboxylic acid groups, in embodiments, three or more carboxylic acid groups. Reagents comprising three or more functional groups enable, promote or enable and promote polymer branching and crosslinking.

Examples of polyacids or polyesters that may be used for preparing an amorphous polyester resin include bio-based acids, such as, rosin acids, terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The polyacid or polyester reagent may be present, for example, in an amount from about 40 to about 60 mole percent of the resin, in embodiments, from about 42 to about 52 mole percent of the resin, in embodiments, from about 45 to about 50 mole percent of the resin, and optionally a second polyacid can be used in an amount from about 0.1 to about 10 mole percent of the resin.

Examples of polyols which may be used in generating an amorphous polyester resin include PET oligomers, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol, and combinations thereof. The amount of organic polyol may vary, and may be present, for example, in an amount from about 40 to about 60 mole percent of the resin, in embodiments, from about 42 to about 55 mole percent of the resin, in embodiments, from about 45 to about 53 mole percent of the resin, and a second polyol may be used in an amount from about 0.1 to about 10 mole percent, in embodiments, from about 1 to about 4 mole percent of the resin.

Polycondensation catalysts may be used in forming the amorphous (or crystalline) polyester resin, and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide, or combinations thereof. Such catalysts may be used in amounts of, for example, from about 0.01 mole percent to about 5 mole percent based on the starting polyacid or polyester reagent(s) used to generate the polyester resin.

Examples of amorphous resins which may be used include alkali sulfonated-polyester resins, branched alkali sulfonated-polyester resins, alkali sulfonated-polyimide resins and branched alkali sulfonated-polyimide resins. Alkali sulfonated polyester resins may be useful in embodiments, such as, the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate) and copoly(propylene-butylene-terephthalate)-copoly(propylene-butylene-5-sulfo-isophthalate), wherein the alkali metal is, for example, a sodium, a lithium or a potassium ion.

In embodiments, an unsaturated amorphous polyester resin may be used as a latex resin. Examples of such resins include those disclosed in U.S. Pat. No. 6,063,827, the disclosure of which hereby is incorporated by reference in entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate) and combinations thereof.

For forming a crystalline polyester resin, suitable polyols include PET oligomers, aliphatic polyols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like, including their structural isomers. The aliphatic polyol may be, for example, selected in an amount from about 40 to about 60 mole percent, in embodiments, from about 42 to about 55 mole percent, in embodiments, from about 45 to about 53 mole percent, and a second polyol may be used in an amount from about 0.1 to about 10 mole percent, in embodiments from about 1 to about 4 mole percent of the resin.

Examples of polyacid or polyester reagents for preparing a crystalline resin include bio-based reagents, such as, rosin acids, oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid (sometimes referred to herein, in embodiments, as cyclohexanedioic acid), malonic acid and mesaconic acid, a polyester or anhydride thereof; and an alkali sulfo-organic polyacid, such as, the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfoterephthalic acid, dimethyl-sulfo-terephthalate, 5-sulfoisophthalic acid, dialkyl-sulfo-terephthalate, sulfo-p-hydroxybenzoic acid, N,N-bis(2-hydroxyethyl)-2-amino ethane sulfonate, or mixtures thereof. The polyacid may be selected in an amount of, for example, in embodiments, from about 40 to about 60 mole percent, in embodiments, from about 42 to about 52 mole percent, in embodiments, from about 45 to about 50 mole percent, and optionally, a second polyacid may be selected in an amount from about 0.1 to about 10 mole percent of the resin.

Specific crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipatenonylene-decanoate), poly(octylene-adipate), and so on, wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

Suitable crystalline resins include those disclosed in U.S. Pub. No. 2006/0222991, the disclosure of which is hereby incorporated by reference in entirety.

In embodiments, a suitable crystalline resin may include a resin formed of ethylene glycol and a mixture of dodecanedioic acid and fumaric acid co-monomers.

The crystalline resin may be present, for example, in an amount from about 1 to about 85% by weight of the toner components, in embodiments, from about 2 to about 50% by weight of the toner components, in embodiments, from about 5 to about 15% by weight of the toner components. The crystalline resin may possess various melting points of, for example, from about 30° C. to about 120° C., in embodiments, from about 50° C. to about 90° C., in embodiments, from about 60° C. to about 80° C. The crystalline resin may have a number average molecular weight ($M_n$), as measured by gel permeation chromatography (GPC) of, for example, from about 1,000 to about 50,000 grams/mole, in embodiments, from about 2,000 to about 25,000 g/mole, and a weight average molecular weight ($M_w$) of, for example, from about 2,000 to about 100,000 g/m, in embodiments, from about 3,000 to about 80,000 g/mole, as determined by GPC using polystyrene standards. The molecular weight distribution ($M_w/M_n$) of the crystalline resin may be, for example, from about 2 to about 6, in embodiments, from about 3 to about 4.

In embodiments, to increase the gloss of the resulting toner (e.g., by about 5 gloss units), changing the ratio of at least two amorphous resins comprising the toner may be carried out.

c. Catalyst

Condensation catalysts which may be used in the polyester reaction include tetraalkyl titanates; dialkyltin oxides, such as, dibutyltin oxide; tetraalkyltins, such as, dibutyltin dilaurate; dibutyltin diacetate; dibutyltin oxide; dialkyltin oxide hydroxides, such as, butyltin oxide hydroxide; aluminum alkoxides, alkyl zinc, dialkyl zinc, zinc oxide, stannous oxide, stannous chloride, butylstannoic acid or combinations thereof.

Such catalysts may be used in amounts of, for example, from about 0.01 mole percent to about 5 mole percent based on the amount of starting polyacid, polyol or polyester reagent in the reaction mixture.

Generally, as known in the art, the polyacid/polyester and polyols reagents are mixed together, optionally with a catalyst, and incubated at an elevated temperature, such as, from about 180° C. or more, from about 190° C. or more, from about 200° C. or more, and so on, which can be conducted anaerobically, to enable esterification to occur until equilibrium, which generally yields water or an alcohol, such as, methanol, arising from forming the ester bonds in esterification reactions. The reaction may be conducted under vacuum to promote polymerization. The product is collected by practicing known methods, and may be dried, again, practicing known methods to yield particulates.

Branching agents may be used, and include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, 1,2,7,8-octanetetracarboxylic acid, acid anhydrides thereof, lower alkyl esters thereof and so on. The branching agent may be used in an amount from about 0.01 to about 10 mole percent of the resin, from about 0.05 to about 8 mole percent, from about 0.1 to about 5 mole percent of the resin.

It may be desirable to crosslink the polymer. A suitable resin conducive to crosslinking is one with a reactive group, such as, a C═C bond or with pendant or side groups, such as, a carboxylic acid group. The resin may be crosslinked, for example, through free radical polymerization with an initiator. Suitable initiators include peroxides, such as, organic peroxides or azo compounds, for example, diacyl peroxides, such as, decanoyl peroxide, lauroyl peroxide and benzoyl peroxide, ketone peroxides, such as, cyclohexanone peroxide and methyl ethyl ketone, alkyl peroxy esters, such as, tbutyl peroxy neodecanoate, 2,5-dimethyl 2,5-di(2-ethyl hexanoyl peroxy)hexane, tamyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, alkyl peroxides, such as, dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5- dimethyl 2,5-di(t-butyl peroxy)hexyne-3, alkyl hydroperoxides, such as, 2,5-dihydro peroxy 2,5-dimethyl hexane, cumene hydroperoxide, t-butyl hydroperoxide and t-amyl hydroperoxide, and alkyl peroxyketals, such as, n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate, azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane), 1,1-di(t-butyl peroxy)-3,3,5-trimethylcyclohexane, combinations thereof and the like. The amount of initiator used is proportional to the degree of crosslinking, and thus, the gel content of the polyester material. The amount of initiator used may range from, for example, about 0.01 to about 10 weight percent, from about 0.1 to about 5 weight percent of the polyester resin. In the crosslinking, it is desirable that substantially all of the initiator be consumed. The crosslinking may be carried out at high temperature, and thus the reaction may be very fast, for example, less than 10 minutes, such as, from about 20 seconds to about 2 minutes residence time.

The polymer reagent then may be incorporated with, for example, other reagents suitable for making a toner particle, such as, a colorant and/or a wax, and processed in a known manner to produce toner particles.

d. Other Resins

Examples of other suitable resins or polymers which may be utilized in forming a toner include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and combinations thereof. The polymer may be, for example, block, random, or alternating copolymers.

2. Colorants

Suitable colorants include those comprising carbon black, such as, REGAL 330® and Nipex 35; magnetites, such as, Mobay magnetites, MO8029™ and MO8060™; Columbian magnetites, MAPICO® BLACK; surface-treated magnetites; Pfizer magnetites, CB4799™, CB5300™, CB5600™ and MCX6369™; Bayer magnetites, BAYFERROX 8600™ and 8610™; Northern Pigments magnetites, NP604™ and NP-608™; Magnox magnetites, TMB-100™ or TMB104™; and the like.

Colored pigments, such as cyan, magenta, orange, violet, brown, blue or mixtures thereof can be used, where the colored pigments exhibit a spectral response reflectance of R=0.20 or lower over the full spectral range, from about 400 to about 700 nm. The additional pigment or pigments may be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, and PIGMENT BLUE I™ available from Paul Uhlich & Company, Inc.; PIGMENT VIOLET I™ available from Dominion Color Corporation, Ltd., and the like.

Other known colorants may be used, such as, Levanyl Black ASF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst), Sunsperse Blue BHD 6000 (Sun Chemicals), Irgalite Blue BCA (CibaGeigy), Paliogen Blue 6470 (BASF), Sudan Orange G (Aldrich), Sudan Orange 220 (BASF), Paliogen Orange 3040 (BASF), Ortho Orange OR 2673 (Paul Uhlich) combinations of the foregoing and the like.

The colorant may be employed in an amount greater than 6%, such as, ranging from about 7% to about 17% by weight of the toner particles on a solids basis, from about 8% to about 15% by weight or from about 9% to about 13% by weight.

In embodiments, portions of the pigment loading, for example furnace carbon black (e.g., but not limited to, Nipex 35), may be replaced by two or more second colorants or pigments that are not blacks. In certain embodiments, the pigment loading is increased by at least about 10%, by at least about 20%, by at least about 30% or more by replacing portions of the black with a set of color pigments that exhibit a spectral response that is substantially the same as carbon black and where such color pigments may be selected based on spectral response curve data.

In embodiments, more than two colorants may be present in a toner particle. For example, three colorants may be present in a toner particle, such as, a first colorant of pigment blue, may be present in an amount ranging from about 1% to about 10% by weight of the toner particle on a solids basis, from about 2% to about 8% by weight, from about 3% to about 4.2% by weight; with a second colorant of pigment orange that may be present in an amount ranging from about 1% to about 10% by weight of the toner particle on a solids basis, from about 2% to about 8% by weight, from about 3% to about 4.5% by weight; with a third colorant of pigment violet that may be present in an amount ranging from about 0% to about 0.81% by weight of the toner particle on a solids basis, from about 0.1% to about 1.0% by weight, from about 0.5% to about 0.7% by weight and so on.

3. Optional Components a. Surfactants

In embodiments, toner compositions, colorants and so on may be in dispersions including surfactants. Emulsion aggregation methods where the polymer and other components of the toner are in combination may employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

In embodiments, the surfactant or the total amount of surfactants may be used in an amount of from about 0.01% to about 5% by weight of the toner forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA210™, IGEPAL CA520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quarternized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

b. Waxes

The toners of the instant disclosure, optionally, may contain a wax, which can be either a single type of wax or a mixture of two or more different types of waxes (hereinafter identified as, "a wax"). A wax can be added to a toner formulation or to a developer formulation, for example, to improve particular toner properties, such as, toner particle shape, charging, fusing characteristics, gloss, stripping, offset properties and the like. Alternatively, a combination of waxes can be added to provide multiple properties to a toner or a developer composition. A wax may be included as, for example, a fuser roll release agent.

The wax may be combined with the resin-forming composition for forming toner particles. When included, the wax may be present in an amount of, for example, from about 1 weight percent to about 25 weight percent of the toner particles, in embodiments, from about 5 weight percent to about 20 weight percent of the toner particles.

Waxes that may be selected include waxes having, for example, a weight average molecular weight of from about 500 to about 20,000, in embodiments, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550P™, a low weight average molecular weight polypropylene available from Sanyo Kasei K. K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and FischerTropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrastearate; sorbitan higher fatty acid ester waxes, such as sorbitan monostearate; cholesterol higher fatty acid ester waxes, such as, cholesteryl stearate, and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

c. Aggregating Factor

An aggregating factor may be an inorganic cationic coagulant, such as, for example, polyaluminum chloride (PAC), polyaluminum sulfosilicate (PASS), aluminum sulfate, zinc sulfate, magnesium sulfate, chlorides of magnesium, calcium, zinc, beryllium, aluminum, sodium, other metal halides including monovalent and divalent halides.

The aggregating factor may be present in an emulsion in an amount of from, for example, from about 0.01 to about 10 weight percent, from about 0.05 to about 5 weight percent based on the total solids in the toner.

The aggregating factor may also contain minor amounts of other components, for example, nitric acid.

In embodiments, a sequestering agent or chelating agent may be introduced after aggregation is complete to sequester or to extract a metal complexing ion, such as, aluminum, from the aggregation process. Thus, the sequestering, chelating or complexing agent used after aggregation is complete may comprise a complexing component, such as, ethylenediaminetetraacetic acid (EDTA), gluconal, hydroxyl-2,2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polysparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid, and mixtures thereof.

d. Surface Additives

In embodiments, the toner particles may be mixed with one or more of silicon dioxide or silica ($SiO_2$), titania or titanium dioxide ($TiO_2$) and/or cerium oxide. Silica may be a first silica and a second silica. The first silica may have an average primary particle size, measured in diameter, in the range of, for example, from about 5 nm to about 50 nm, from about 5 nm to about 25 nm, from about 20 nm to about 40 nm. The second silica may have an average primary particle size, measured in diameter, in the range of, for example, from about 100 nm to about 200 nm, from about 100 nm to about 150 nm, from about 125 nm to about 145 nm. The second silica may have a larger average size (diameter) than the first silica. The titania may have an average primary particle size in the range of, for example, about 5 nm to about 50 nm, from about 5 nm to about 20 nm, from about 10 nm to about 50 nm. The cerium oxide may have an average primary particle size in the range of, for example, about 5 nm to about 50 nm, from about 5 nm to about 20 nm, from about 10 nm to about 50 nm. Examples of such additives include those disclosed in U.S. Pat. Nos. 3,590,000; 3,720,617; 3,655,374; and 3,983,045, the disclosure of each of which hereby is incorporated by reference in entirety.

Zinc stearate also may be used as an external additive. Calcium stearate and magnesium stearate may provide similar functions. Zinc stearate may have an average primary particle size in the range of, for example, from about 500 nm to about 700 nm, from about 500 nm to about 600 nm, from about 550 nm to about 650 nm.

Surface additives may be used in an amount of from about 0.1 to about 10 weight percent, or from about 0.5 to about 7 weight percent of the toner.

Other surface additives include lubricants, such as, a metal salt of a fatty acid (e.g., zinc or calcium stearate) or long chain alcohols, such as, UNILIN 700 available from Baker Petrolite and AEROSIL 8972® available from Degussa. The coated silicas of U.S. Pat. Nos. 6,190,815 and 6,004,714, the disclosures of each of which hereby are incorporated by reference in entirety, also can be present.

Silica, for example, may enhance toner flow, tribo control, admix control, improved development and transfer stability and higher toner blocking temperature. Zinc, calcium or magnesium stearate also may provide developer conductivity, tribo enhancement, higher toner charge and charge stability. The external surface additives may be used with or without a coating or shell.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained catalyst, for example, $Al^{3+}$, in toner particles of the present disclosure may be from about 0.1 pph to about 1 pph, in embodiments, from about 0.25 pph to about 0.8 pph. The gloss level of a toner of the instant disclosure may have a gloss, as measured by Gardner gloss units (gu), of from about 20 gu to about 100 gu, from about 50 gu to about 95 gu, from about 60 gu to about 90 gu.

B. Toner Particle Preparation

1. Method a. Particle Formation

The toner particles may be prepared by any method within the purview of one skilled in the art, for example, any of the emulsion/aggregation methods may be used with a polyester resin and the optional first and optional second colorants as taught herein. Any suitable method of preparing toner particles may be used, including chemical processes, such as, suspension and encapsulation processes disclosed, for example, in U.S. Pat. Nos. 5,290,654 and 5,302,486, the disclosure of each of which hereby is incorporated by reference in entirety; by conventional granulation methods, such as, jet milling; pelletizing slabs of material; other mechanical processes; any process for producing nanoparticles or microparticles; and so on.

In embodiments relating to an emulsification/aggregation process, a plurality of resins, one or more of which is a sustainable resin, such as one comprising a PET oligomer, a bio-based polyester/polyacid or both of interest may be dissolved in a solvent, and may be mixed into an emulsion medium, for example, water, such as, deionized water, optionally containing a stabilizer, and optionally a surfactant. Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide; ammonium hydroxide; alkali metal carbonates, such as, sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. When a stabilizer is used, the stabilizer may be present in amounts of from about 0.1% to about 5%, from about 0.5% to about 3% by weight of the resin.

Optionally, a surfactant may be added to the aqueous emulsion medium, for example, to afford additional stabilization to the resin or to enhance emulsification of the resin. Suitable surfactants include anionic, cationic and nonionic surfactants as taught herein.

Following emulsification, toner compositions may be prepared by aggregating a mixture of a resin, the first and optional second colorants of interest, an optional wax and any other desired additives in an emulsion, optionally, with surfactants as described above, and then optionally coalescing the aggregate mixture. A mixture may be prepared by adding an optional wax or other materials, which may also be optionally in a dispersion, including a surfactant, to the emulsion comprising a resin-forming material and the first and second colorants, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing may be at from about 600 to about 4,000 rpm. Homogenization may be by any suitable means, including, for example, an IKA ULTRA TURRAX T50 probe homogenizer.

b. Aggregation

Following preparation of the above mixture, often, it is desirable to form larger particles or aggregates, often sized in micrometers, of the smaller particles from the initial polymerization reaction, often sized in nanometers. An aggregating factor may be added to the mixture. Suitable aggregating factors include, for example, aqueous solutions of a divalent cation, a multivalent cation or a compound comprising same.

The aggregating factor, as provided above, may be, for example, a polyaluminum halide, such as, polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof.

In embodiments, the aggregating factor may be added to the mixture at a temperature that is below the glass transition temperature ($T_g$) of the resin or of a polymer.

The aggregating factor may be added to the mixture components to form a toner in an amount of, for example, from about 0.1 part per hundred (pph) to about 1 pph, in embodiments, from about 0.25 pph to about 0.75 pph, in embodiments, about 0.5 pph of the reaction mixture.

To control aggregation of the particles, the aggregating factor may be metered into the mixture over time. For example, the factor may be added incrementally into the mixture over a period of from about 5 to about 240 minutes, in embodiments, from about 30 to about 200 minutes.

Addition of the aggregating factor also may be done while the mixture is maintained under stirred conditions, in embodiments, from about 50 rpm to about 1,000 rpm, in embodiments, from about 100 rpm to about 500 rpm; and at a temperature that is below the $T_g$ of the resin or polymer, in embodiments, from about 30° C. to about 90° C., in embodiments, from about 35° C. to about 70° C. The growth and shaping of the particles following addition of the aggregation factor may be accomplished under any suitable condition(s).

The particles may be permitted to aggregate until a predetermined desired particle size is obtained. Particle size may be monitored during the growth process. For example, samples may be taken during the growth process and analyzed, for example, with a COULTER COUNTER, for average particle size. The aggregation thus may proceed by maintaining the mixture, for example, at elevated temperature, or slowly raising the temperature, for example, from about 40° C. to about 100° C., and holding the mixture at that temperature for from about 0.5 hours to about 6 hours, in embodiments, from about hour 1 to about 5 hours, while maintaining stirring, to provide the desired aggregated particles. Once the predetermined desired particle size is attained, the growth process is halted.

Once the desired final size of the toner particles or aggregates is achieved, the pH of the mixture may be adjusted with base to a value of from about 6 to about 10, in embodiments, from about 6.2 to about 7. The adjustment of pH may be used to freeze, that is, to stop, toner particle growth. The base used to stop toner particle growth may be, for example, an alkali metal hydroxide, such as, for example, sodium hydroxide, potassium hydroxide, ammonium hydroxide, combinations thereof and the like. In embodiments, EDTA may be added to assist adjusting the pH to the desired value. The base may be added in amounts from about 2 to about 25% by weight of the mixture, in embodiments, from about 4 to about 10% by weight of the mixture.

The characteristics of the toner particles may be determined by any suitable technique and apparatus. Volume average particle diameter and geometric standard deviation may be measured using an instrument, such as, a Beckman Coulter MULTISIZER 3, operated in accordance with the instructions of the manufacturer.

The growth and shaping may be conducted under conditions in which aggregation occurs separate from coalescence. For separate aggregation and coalescence stages, the aggregation process may be conducted under shearing conditions at an elevated temperature, for example, of from about 40° C. to about 90° C., in embodiments, from about 45° C. to about 80° C., which may be below the $T_g$ of the resin or a polymer.

In embodiments, the aggregate particles may be of a size of less than about 3 µm, in embodiments from about 2 µm to about 6 µm, in embodiments from about 3 µm to about 5 µm.

In embodiments, after aggregation, but prior to coalescence, a resin coating may be applied to the aggregated particles to form a shell thereover. Any resin described herein or as known in the art may be used as the shell. In embodiments, a sustainable polyester amorphous resin latex as described herein, such as one comprising PET oligomers, a bio-based polyester/polyacid or both may be included in the shell. In embodiments, a polyester amorphous resin latex described herein, such as one comprising PET oligomers, a bio-based polyacid/polyester or both, may be combined with a different resin, and then added to the particles as a resin coating to form a shell.

A shell resin may be applied to the aggregated particles by any method within the purview of those skilled in the art. In embodiments, the resins used to form the shell may be in an emulsion, optionally including any surfactant described herein. The emulsion possessing the resins may be combined with the aggregated particles so that the shell forms over the aggregated particles.

The formation of the shell over the aggregated particles may occur while heating to a temperature from about 30° C. to about 80° C., in embodiments, from about 35° C. to about 70° C. The formation of the shell may take place for a period of time from about 5 minutes to about 10 hours, in embodiments, from about 10 minutes to about 5 hours.

The shell may be present in an amount from about 1% by weight to about 80% by weight of the toner components, in embodiments, from about 10% by weight to about 40% by weight of the toner components, in embodiments from about 20% by weight to about 35% by weight of the toner components.

c. Coalescence

Following aggregation to a desired particle size and application of any optional shell, the particles then may be coalesced to a desired final shape, such as, a circular shape, for example, to correct for irregularities in shape and size, the coalescence being achieved by, for example, heating the mixture to a temperature from about 45° C. to about 100° C., in embodiments, from about 55° C. to about 99° C., which may be at or above the $T_g$ of the resins used to form the toner particles, and/or reducing the stirring, for example to from about 1000 rpm to about 100 rpm, in embodiments, from about 800 rpm to about 200 rpm. Coalescence may be conducted over a period from about 0.01 to about 9 hours, in embodiments, from about 0.1 to about 4 hours, see, for example, U.S. Pat. No. 7,736,831.

Optionally, a coalescing agent may be used. Examples of suitable coalescence agents include, but are not limited to, benzoic acid alkyl esters, ester alcohols, glycol/ether-type solvents, long chain aliphatic alcohols, aromatic alcohols, mixtures thereof and the like. Examples of benzoic acid alkyl esters include those where the alkyl group, which may be straight or branched, substituted or unsubstituted, has from about 2 to about 30 carbon atoms, such as, decyl or isodecyl benzoate, nonyl or isononyl benzoate, octyl or isooctyl benzoate, 2-ethylhexyl benzoate, tridecyl or isotridecyl benzoate, 3,7dimethyloctyl benzoate, 3,5,5-trimethylhexyl benzoate, mixtures thereof and the like.

In embodiments, the coalescence agent (or coalescing agent or coalescence aid agent) evaporates during later stages of the emulsion/aggregation process, such as, during a second heating step, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not affect any properties or the performance of the toner or developer.

The coalescence agent can be added prior to the coalescence or fusing step in any desired or suitable amount. For example, the coalescence agent may be added in an amount of from about 0.01 to about 10% by weight, based on the solids content in the reaction medium. Of course, amounts outside those ranges can be used, as desired.

In embodiments, the coalescence agent can be added at any time between aggregation and coalescence, although in some embodiments it may be desirable to add the coalescence agent after aggregation is, "frozen," or completed, for example, by adjustment of pH, for example, by addition, for example, of base.

Coalescence may proceed and be accomplished over a period of from about 0.1 to about 9 hours.

After coalescence, the mixture may be cooled to room temperature, such as, from about 20° C. to about 25° C. The cooling may be rapid or slow, as desired. A suitable cooling method may include introducing cold water in a jacket around the reactor. After cooling, the toner particles optionally may be washed with water and then dried. Drying may be accomplished by any suitable method for drying including, for example, freeze drying.

d. Shells

As described above, an optional shell may be applied to the formed toner particles, aggregates or coalesced particles. Any polymer, such as, a sustainable polymer or resin, including those described above as suitable for the core, such as one comprising PET oligomers, bio-based polyacid/polyester or both may be used for the shell. The shell polymer may be applied to the particles or aggregates by any method within the purview of those skilled in the art.

e. Optional Additives

In embodiments, the toner particles also may contain other optional additives.

i. Charge Additives

The toner may include any known charge additives in amounts of from about 0.1 to about 10 weight %, in embodiments, of from about 0.5 to about 7 weight % of the toner. Examples of such charge additives include alkyl pyridinium halides, bisulfates, the charge control additives of U.S. Pat. Nos. 3,944,493; 4,007,293; 4,079,014; 4,394,430; and 4,560,635, the disclosure of each of which hereby is incorporated by reference in entirety, negative charge enhancing additives, such as, aluminum complexes, and the like.

Charge enhancing molecules can be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

ii. Surface Modifications

As provided above, toner can comprise various surface modifications to obtain desired properties.

The dry toner particles, exclusive of external surface additives, may have the following characteristics: (1) volume average diameter (also referred to as "volume average particle diameter") of from about 2.5 to about 20 μm, in embodiments, from about 2.75 to about 10 μm, in embodiments, from about 3 to about 7.5 μm; (2) number average geometric standard deviation (GSDn) and/or volume average geometric standard deviation (GSDv) of from about 1.18 to about 1.30, in embodiments, from about 1.21 to about 1.24; and (3) circularity of from about 0.9 to about 1.0 (measured with, for example, a Sysmex FPIA 2100 analyzer), in embodiments, from about 0.95 to about 0.985, in embodiments, from about 0.96 to about 0.98.

III. Developers

A. Composition

The toner particles thus formed may be formulated into a developer composition. For example, the toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer, with the remainder of the developer composition being the carrier. However, different toner and carrier percentages may be used to achieve a developer composition with desired characteristics.

1. Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. For example, coatings containing polyvinylidenefluoride, available, for example, as KYNAR 301F™, and/or polymethylmethacrylate (PMMA), for example, having a weight average molecular weight of about 300,000 to about 350,000, such as, commercially available from Soken, may be used. In embodiments, PMMA and polyvinylidenefluoride may be mixed in proportions of from about 30 to about 70 weight percent to about 70 to about 30 weight percent, in embodiments, from about 40 to about 60 weight percent to about 60 to about 40 weight percent. The coating may have a coating weight of, for example, from about 0.1 to about 5% by weight of the carrier, in embodiments, from about 0.5 to about 2% by weight of the carrier.

The carrier particles may be prepared by mixing the carrier core with polymer in an amount from about 0.05 to about 10% by weight, in embodiments, from about 0.01 to about 3% by weight, based on the weight of the coated carrier particle, until adherence thereof to the carrier core is obtained, for example, by mechanical impaction and/or electrostatic attraction.

IV. Devices Comprising a Toner Particle

Toners and developers may be combined with a number of devices ranging from enclosures or vessels, such as, a vial, a bottle, a flexible container, such as a bag or a package, and so on, to devices that serve more than a storage function.

A. Imaging Device Components

The toner compositions and developers of interest may be incorporated into devices dedicated, for example, to delivering same for a purpose, such as, forming an image. Hence, particularized toner delivery devices are known, see, for example, U.S. Pat. No. 7,822,370, and may contain a toner preparation or developer of interest. Such devices include cartridges, tanks, reservoirs and the like, and may be replaceable, disposable or reusable. Such a device may comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

B. Toner or Developer Delivery Device

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

V. Imaging Devices

The toners or developers may be used for electrostatographic or electrophotographic processes, including those disclosed in U.S. Pat. No. 4,295,990, the disclosure of which hereby is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples illustrate embodiments of the instant disclosure. The Examples are intended to be illustrative only and are not intended to limit the scope of the present disclosure. Parts and percentages are by weight unless otherwise indicated. As used herein, RT refers to a temperature of from about 20° C. to about 30° C.

EXAMPLES

Example 1

Depolymerization of Polyethylene Terephthalate Bottles using Propylene Glycol

Empty PET bottles were washed, dried, and shredded to a granular material approximately 3 mm by 3 mm by 1 mm in size. The granular PET (500 g) was loaded into a Hoppes 2 L reactor and propylene glycol (750 g) and a zinc acetate catalyst (2.5 g) were added to the reactor. The reactor was closed and the jacket temperature was set to 213° C. The reactor was then pressurized with nitrogen to 200 kPaA and the stirrer set to 50 rpm. A needle valve was used to maintain a small flow of nitrogen into the reactor that carried over propylene glycol vapor to the reflux condenser set to a jacket temperature of 130° C. Condensed propylene glycol can then be returned from the reflux condenser to the reactor. The reaction proceeded under these conditions for 8 hours to yield a clear liquid. The reactor jacket temperature was reduced to RT and the contents were left in the reactor overnight.

Example 2

Production of a Recycled Polyethylene Terephthalate Oligomers or Pre-Polymer

The contents of the reactor were reheated with a jacket temperature set to 213° C. to distill propylene glycol over 7 hours using both nitrogen purge and later, vacuum. The reactor impeller was set to stir at 3 rpm. The propylene glycol distillate was recovered for reuse in the next depolymerization reaction. A prepolymer consisting now of primarily of oligomeric PET remained in the reactor with a softening point of 101° C., as measured by a Mettler Toledo softening point apparatus. GPC analysis revealed an Mw of 3454 g/m, an Mn of 2058 g/m, a PDI of 1.67 and an Mz of 5162 g/m.

Example 3

Production of a Toner Resin

PET oligomer (365.85 g), trimellitic anhydride (25.9 g), tetrapropenyl succinic anhydride (72.2 g), and Fascat 4100 (butyl(hydroxy)stannanone, 2.8 g) were loaded into a 1 L Parr reactor. The reactor temperature was set to 210° C. and an argon purge was applied that carried over water from the condensation process into a condenser. The reaction was run for 7 hours to produce a polymer with a softening point of 121° C. The reactor contents were discharged and the reactor was cooled.

The resin was analyzed and found to have a Tg (on or onset) of 59.5° C.; an Mw of 20,800 daltons; an Mn of 3,000 daltons; an Mz of 584,000 daltons; and a PDI of 6.9, values similar to that of commercially available toner.

Example 4

Sustainable Resin

A 2 Liter hopes reactor equipped with a mechanical agitator, distillation apparatus and bottom drain valve were charged with 336 grams of recycled PETE (available from Reichhold, Mw=840), 64 grams of 1,2 propylene glycol and 2 grams of FASCAT 4100 (Arkema, Philadelphia, Pa.). The mixture was heated over a 3 hour period to 185° C. and maintained for an additional hour. To that mixture were then added 41 grams of succinic acid, 623 grams of Resinal 830 (rosin-fumarate adduct), 16 grams of glycerol and 53 grams of 1,2-propylene glycol. The mixture was then heated to 205° C. and at 30 KPa of pressure using nitrogen over a 2 hour period and maintained for an additional 3 hours. The pressure was then reduced to atmospheric and the temperature was increased to 225° C. The pressure was then reduced to −70 KPa over a 1 hour period and maintained until the softening point of the resin was 138° C. The resin was the discharged into a metal pan and left to cool to room temperature. The resin had a Tg of 64° C. and a biorenewable or sustainability content of 67% as measured by $C^{14}$ analysis. The recycled PET content in the resin was 32% by weight giving an overall >90% sustainability content.

An emulsion of the bio-based sustainable amorphous polyester resin was then prepared by dissolving 100 grams of the resin in 100 grams of methyl ethyl ketone and 3 grams of isopropanol. The resulting mixture was then heated to 40° C. with stirring, and to the mixture were added dropwise 5.5 grams of ammonium hydroxide (10% aqueous solution), after which 200 grams of water were added dropwise over a 30 minute period. The resulting dispersion was then heated to 80° C. and the methyl ethyl ketone was distilled to result in a 41.5 millimeter percent solid dispersion of the sustainable polyester in water. The sustainable polyester emulsion particles were measured to have a diameter of 185 nm and 16.8% by weight in water.

Example 5

Sustainable Resin Emulsion

A 2 Liter hopes reactor equipped with a mechanical agitator, distillation apparatus and bottom drain valve were charged with 604.8 grams of disproportionate rosin acid (Arakawa, KR-614), 254.9 grams of glycerine carbonate and 1.14 grams of 2-methylimidazole. The mixture was heated to 175° C. for 6 hours, after which were added 168 grams of recycled PET (Reichhold, Mw=840), 56.8 grams of 1,6-hexanediol, 504 grams of isophthalic acid, 159.6 grams of dodecylsuccinic acid and 2 grams of FASCAT 4100. The mixture was heated over a 3 hour period to 205° C. and maintained for an additional 3 hours. The mixture was then heated to 225° C. and at −70 KPa of reduced pressure and maintained for an additional 3 hours, until the softening point of the resin was 112° C. The resin was the discharged into a metal pan and left to cool to room temperature. The resin had a Tg of 57° C. and an acid value of 12.1.

An emulsion of the sustainable polyester resin was then prepared by dissolving 100 grams of the resin in 100 grams of methyl ethyl ketone and 3 grams of isopropanol. The mixture resulting was then heated to 40° C. with stirring and to the mixture were added dropwise 5.5 grams of ammonium hydroxide (10% aqueous solution), after which 200 grams of water were added dropwise over a 30 minute period. The resulting dispersion was then heated to 80° C., and the methyl ethyl ketone was distilled to result in a 41.5 millimeter percent solid dispersion of the bio-based sustainable polyester in water. The sustainable polyester emulsion particles were measured to be 180 nm in diameter and 16.08% by weight in water.

Example 6

Production of Toner

Into a 2 liter glass beaker with a magnetic stir bar were added 146 g sustainable resin emulsion of Example 4 (16.08 weight percent), 9.27 g of a commercially available crystalline resin emulsion (35.17 weight percent), 14.49 g IGI wax dispersion (29.93 weight percent) and 16.37 g cyan pigment PB15:3 (17.21 weight percent). Separately, 0.84 g $Al_2(SO_4)_3$ (27.85 weight percent) were added as flocculent under homogenization. The mixture was heated to 40.7° C. to aggregate the particles while stirring at 700 rpm. The particle size was monitored with a COULTER COUNTER until the core particles reached a volume average particle size of 4.49 μm with a GSDv of 1.29. Then, 81.0 g of the sustainable resin emulsion of Example 4 were added as shell material, resulting in core-shell structured particles with an average particle size of 6.28 μm, GSDv of 1.31. Thereafter, the pH of the reaction slurry was increased to 7.59 using 4 weight percent NaOH solution followed by 3.62 g EDTA (39 weight percent) to freeze toner growth. After freezing, the reaction mixture was heated to 79.4° C. for coalescence. The toner was quenched resulting in a final particle size of 7.27 μm, GSDv of 1.39. The toner slurry was cooled to room temperature, separated by sieving (25 μm), filtration, followed by washing and freeze dried.

Example 7

Production of Toner

Into a 2 liter glass beaker with a magnetic stir bar were added 152.64 g of the sustainable resin emulsion of Example 5 (16.08 weight percent), 9.27 g of a commercially available crystalline resin emulsion (35.17 weight percent), 14.49 g IGI wax dispersion (29.93 weight percent) and 16.37 g cyan pigment PB15:3 (17.21 weight percent). Separately, 0.84 g $Al_2(SO_4)_3$ (27.85 weight percent) were added as flocculent under homogenization. The mixture was heated to 40.7° C. to aggregate the particles while stirring at 700 rpm. The particle size was monitored with a COULTER COUNTER until the core particles reached a volume average particle size of 4.51 μm with a GSDv of 1.28. Then, 84.30 g of the sustainable resin emulsion of Example 5 were added as shell material resulting in core-shell structured particles with an average particle size of 6.28 μm, GSDv of 1.31. Thereafter, the pH of the reaction slurry was increased to 7.59 using 4 wt % NaOH solution followed by 3.62 g EDTA (39 weight percent) to freeze toner growth. After freezing, the reaction mixture was heated to 79.4° C. for coalescence. The toner was quenched resulting in a final particle size of 6.87 μm, GSDv of 1.32. The toner slurry was then cooled to room temperature, separated by sieving (25 μm), filtration, followed by washing and freeze dried.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in their entireties.

We claim:

1. An amorphous polyester toner resin consisting of a depolymerized polyethylene terephthalate (PET) polyol monomer, a diacid monomer or anhydride thereof and an optional diol, wherein said diacid comprises a biodegradable diacid, a non-biodegradable diacid or both; said PET polyol comprises ethylene terephthalate and PET oligomers; said diacid monomer or anhydride thereof comprises a trimellitic anhydride and a succinic anhydride said optional diol comprises a biodegradable diol, a non-biodegradable diol or both; said toner resin further comprising an optional polyol, an optional polyacid or both, wherein said optional polyol and said optional polyacid comprise at least three functional groups; and said toner resin comprises a sustainability content of at least about 70%.

2. The toner resin of claim 1, comprising a sustainability content of at least about 80%.

3. The toner resin of claim 1, wherein said PET polyol comprises a molecular weight from about 200 to about 5000 g/mole.

4. The toner resin of claim 1, wherein said PET polyol comprises a molecular weight from about 600 to about 2000 g/mole.

5. The toner resin of claim 1, wherein said toner resin comprises a rosin polyacid.

6. A toner particle comprising the amorphous polyester toner resin of claim 1, an optional second amorphous resin and an optional crystalline resin.

7. The toner particle of claim 6, further comprising said second amorphous resin comprising a depolymerized recycled PET polyol and a bio-based polyester or polyacid reagent, comprising a sustainability content of at least about 70%.

8. The toner particle of claim 7, wherein said PET polyol comprises a molecular weight from about 200 to about 5000 g/mole.

9. The toner particle of claim 7, wherein said PET polyol comprises a molecular weight from about 600 to about 2000 g/mole.

10. The toner particle of claim 7, wherein said second amorphous polyester resin comprises a rosin polyacid.

11. The toner particle of claim 6, further comprising said crystalline resin, wherein said crystalline resin comprises a depolymerized recycled PET polyol, a diacid and an optional diol, wherein said diacid comprises a biodegradable diacid, a non-biodegradable diacid or both; said optional diol comprises a biodegradable dial, a non-biodegradable diol or both; and said crystalline resin further comprising an optional polyol, an optional polyacid or both, wherein said optional polyol and said optional polyacid comprise at least three functional groups.

12. The toner particle of claim 11, wherein said PET polyol comprises a molecular weight from about 200 to about 5000 g/mole.

13. The toner polyester of claim 1, wherein said PET polyol comprises a molecular weight from about 600 to about 2000 g/mole.

14. The toner particle of claim 11, wherein said crystalline resin comprises a rosin polyacid.

15. The toner particle of claim 6, further comprising a shell comprising a depolymerized recycled polyethylene terephthalate (PET) polyol, a diacid and an optional diol, wherein said diacid comprises a biodegradable diacid, a non-biodegradable diacid or both; said optional diol comprises a biodegradable diol, a non-biodegradable diol or both; and said shell further comprising an optional polyol, an optional polyacid or both, wherein said optional polyol and said optional polyacid comprise at least three functional groups.

16. The toner particle of claim 15, wherein said PET polyol comprises a molecular weight from about 200 to about 5000 g/mole.

17. The toner particle of claim 15, wherein said PET polyol comprises a molecular weight from about 600 to about 2000 g/mole.

18. The toner particle of claim 15, wherein said shell comprises a rosin polyacid.

19. The toner particle of claim 6, comprising an emulsion-aggregation toner.

20. The toner particle of claim 6, comprising a wax.

* * * * *